United States Patent
Resurreccion et al.

(10) Patent No.: US 8,874,925 B1
(45) Date of Patent: Oct. 28, 2014

(54) SYSTEMS AND METHODS TO SCAN MEMORY FOR A THREAT

(75) Inventors: Rei Resurreccion, North Sydney (AU); Jonathan San Jose, Southbank (AU)

(73) Assignee: Symantec Corporation, Mountain View, CA (US)

( * ) Notice: Subject to any disclaimer, the term of this patent is extended or adjusted under 35 U.S.C. 154(b) by 256 days.

(21) Appl. No.: 13/188,340

(22) Filed: Jul. 21, 2011

(51) Int. Cl.
*G06F 21/64* (2013.01)

(52) U.S. Cl.
USPC .......................................... 713/180; 707/687

(58) Field of Classification Search
USPC ........... 713/176, 180; 719/328; 714/732, 763, 714/805; 707/609, 634, 635, 687, 705, 749, 707/758
See application file for complete search history.

(56) References Cited

U.S. PATENT DOCUMENTS

| 2003/0101381 A1* | 5/2003 | Mateev et al. ................... 714/38 |
| 2007/0055711 A1* | 3/2007 | Polyakov et al. .............. 707/203 |
| 2012/0272318 A1* | 10/2012 | Doukhvalov ................... 726/24 |

* cited by examiner

*Primary Examiner* — Kambiz Zand
*Assistant Examiner* — Leynna Truvan
(74) *Attorney, Agent, or Firm* — Holland & Hart LLP

(57) ABSTRACT

A computer-implemented method to scan memory for a threat is described. At least one application programming interface (API) is monitored. A back-trace operation is performed from the at least one API to identify a process that called the at least one API. An address in memory is retrieved for the identified process. At least a portion of the memory associated with the address of the identified process is scanned. A signature based on the scanned portion of the memory is generated.

20 Claims, 8 Drawing Sheets

SYSTEMS AND METHODS TO SCAN MEMORY FOR A THREAT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Various threats may be harmful to computers. These threats may include malware, shellcode, viruses, worms, and the like. Threats to computers are a problem in modern day computing. For example, a computer threat may be a program that may attach to other programs and/or objects, may replicate itself, and/or may perform unsolicited or malicious actions on a computer. Computer threats may cause unrecoverable errors, delete files, create intermittent problems and otherwise cause individuals and businesses much frustration and other damage. Attacks on computers carried out by these threats seek to exploit vulnerabilities in computers.

Threats may enter a computer system in a number of ways. For example, a threat may be knowingly downloaded to a computer, such as where the undesired malicious effect is not known or appreciated at the time of downloading the threat. Further, a threat may tag along with other threats that are downloaded to the computer. Still further, the threat may enter the computer system unknown to the computer user. These threats have effects on the computer that may be unknown to the user and/or undesired by the user.

SUMMARY

According to at least one embodiment, a computer-implemented method to scan memory for a threat is described. At least one application programming interface (API) is monitored. A back-trace operation is performed from the at least one API to identify a process that called the at least one API. An address in memory is retrieved for the identified process. At least one signature is retrieved from a database. At least a portion of the memory associated with the address of the identified process is scanned. Upon determining that the scanned memory matches the at least one retrieved signature, the execution of the identified process is blocked. Upon determining that the scanned memory does not match the at least one retrieved signature, a signature based on the scanned portion of the memory is generated.

In one embodiment, the generated signature identifies the threat. In one configuration, the threat may be decrypted shellcode stored in memory. In one example, the threat may be unpacked malware stored in memory. In one embodiment, a first set of rules associated with the at least one API may be created. In one configuration, a second set of rules associated with a process used by the threat may be created.

A predetermined size of memory to scan may be set based on the location of the address of the identified process. In one configuration, a search may be performed for predetermined operational code in the memory from the location of the address of the identified process.

In one embodiment, the generated signature may be transmitted to a server. The server may store the generated signature in a database.

A computing device configured to scan memory for a threat is also described. The computing device may include a processor and memory in electronic communication with the processor. The computing device may also include a detection module configured to monitor at least one application programming interface (API) and perform a back-trace operation from the at least one API to identify a process that called the at least one API. The detection module may also be configured to retrieve an address in memory for the identified process and at least one signature from a database. The module may be further configured to scan at least a portion of the memory associated with the address of the identified process Upon determining that the scanned memory matches the at least one retrieved signature, the detection module may be configured to block the execution of the identified process. Upon determining that the scanned memory does not match the at least one retrieved signature, the detection module may be further configured to generate a signature based on the scanned portion of the memory.

A computer-program product to scan memory for a threat is also described. The computer-program product may include a non-transitory computer-readable medium having instructions thereon. The instructions may include code programmed to monitor at least one application programming interface (API) and code programmed to perform a back-trace operation from the at least one API to identify a process that called the at least one API. The instructions may also include code programmed to retrieve an address in memory for the identified process and also retrieve at least one signature from a database. The instructions may further include code programmed to scan at least a portion of the memory associated with the address of the identified process. Upon determining that the scanned memory matches the at least one retrieved signature, the instructions may include code programmed to block the execution of the identified process. Further, upon determining that the scanned memory does not match the at least one retrieved signature, the instructions may include code programmed to generate a signature based on the scanned portion of the memory.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
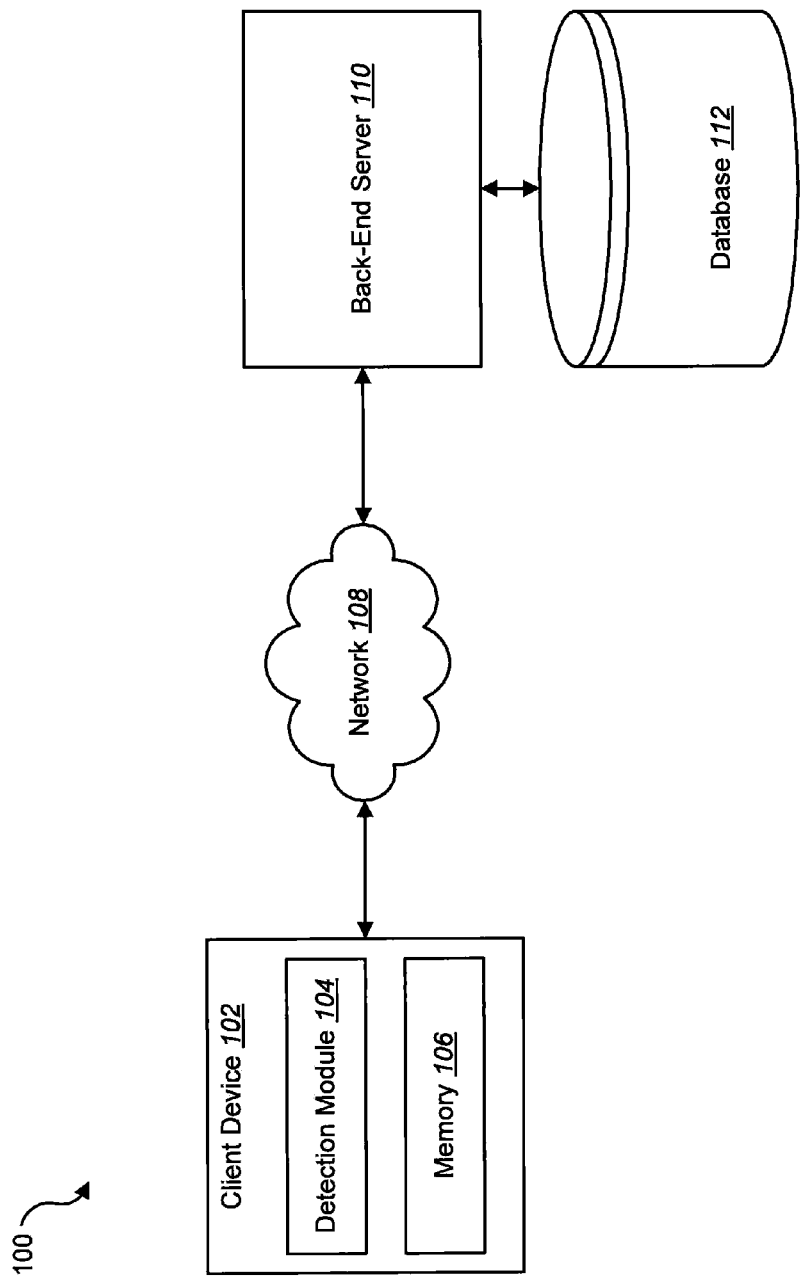
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A threat to a computing system may be used to cause harm to the system. A threat may include malicious software, also known as malware. In one configuration, malware may be software that is included or inserted in a part of a computing system or computing systems for a harmful purpose. The term threat may include possible, potential, and actual threats. Types of malware may include, but are not limited to, malicious libraries, viruses, worms, trojans, adware, malicious active content, and denial of service attacks.

In one example, a threat may also include shellcode. Shellcode may include a small piece of code used as the payload in the exploitation of a software vulnerability. Shellcode may begin executing by starting a command shell from which an attacker can control the compromised computing system. Shellcode may either be local or remote, depending on whether it gives the attacker control over the system it runs on (local) or over another system through a network (remote).

Local shellcode may be used by an attacker who has limited access to a system, but can exploit a vulnerability in a higher-privileged process on that system. If successfully executed, the shellcode may provide the attacker access to the system with the same higher privileges as the targeted process.

Remote shellcode may be used when an attacker desires to target a vulnerable process running on another system on a local network or intranet. If successfully executed, the shellcode may provide the attacker access to the target system across the network.

In one example, processes may filter or restrict the data that can be injected into the processes. In addition, anti-malware programs may exist to detect and combat malware. Developers, however, of malware and shellcode may use different packers or encryption techniques to make the threat hard to detect or to analyse. For example, with shellcodes, the encryption may prevent readable strings within the shellcode such as Uniform Resource Locators (URLs), Application Programming Interface (API) names, and the like from being visible in raw form.

Developers of anti-virus and anti-malware programs may generate a signature to identify a detected threat. These signatures, however, may be generated using emulation techniques or decryption techniques to detect the threat. A disadvantage of the emulation technique is that not all packers of threats may be capable of being emulated.

Signatures for threats may also be generated based on a packed and encrypted file. In addition, signatures may be generated based on how the threat was packed. In these cases, the signatures based on the packer and encryption techniques are usually limited. For example, shellcode includes small pieces of code and different decrypted shellcodes may be similar with one of the only differences being how these different shellcodes are encrypted.

In one configuration, the present systems and methods may perform a scan on decrypted shellcode without using emulation to prevent an attack and generate a signature for the decrypted shellcode that could be used to identify future threats. The present systems and methods may also be applied to malware to detect the unpacked form of the code and generate a signature for the unpacked form of the code that may be used to detect malicious code and functions that are being reused by developers of malware.

In one embodiment, the present systems and methods may scan an unpacked and decrypted sample from the memory of a computing system. Using a set of API rules, a back-trace operation may be performed to identify a caller of an API function. A range of memory from the caller code may be set for scanning. A shellcode signature may be generated from a decrypted form of shellcode and a malware signature may be generated from an unpacked form of a suspicious file. These signatures may be used to identify and prevent future threats.

FIG. 1 is a block diagram illustrating one embodiment of an environment 100 in which the present systems and methods may be implemented. In one configuration, a client device 102 may communicate with a back-end server 110 across a network 108. The client device 102 may be, but is not limited to, a type of processing system, computer or computerized device, personal computer (PC), mobile device, cellular or satellite telephone, mobile data terminal, tablet, portable computer, Personal Digital Assistant (PDA), thin client, or any other type of digital electronic device. The network 108 may be, for example, the Internet, a Wide Area Network (WAN), a Local Area Network (LAN), an intranet, and the like. In one embodiment, the back-end server 110 may communicate with a database 112. The database 112 may be remote to the server 110 or included within a memory portion of the server 110. In addition, the client device 102 may be in electronic communications with the database 112.

In one example, the client device 102 may include a detection module 104 and memory 106. The detection module 104 may detect and identify a threat that may be present on the client device 102. Further, the detection module 104 may detect and identify a potential threat attempting to compromise the client device 102. In one configuration, the threat may be stored in the memory 106. The detection module 104 may scan some or all of the memory 106 to detect and identify the threat. For example, the threat may be packed or encrypted. The threat may be unpacked or decrypted and stored in the memory 106. The detection module 104 may detect and identify the unpacked or decrypted threat by scanning the memory 106. Details regarding the detection module 104 will be described below.

Figure 2:
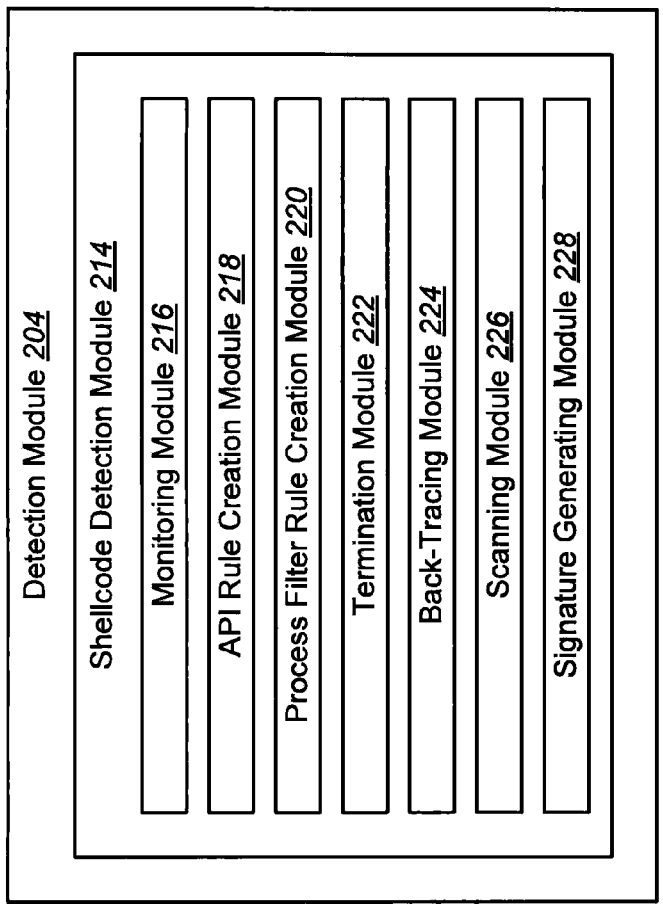
FIG. 2 is a block diagram illustrating one embodiment of a detection module in accordance with the present systems and methods.

FIG. 2 is a block diagram illustrating one embodiment of a detection module 204 in accordance with the present systems and methods. In one configuration, the detection module 204 may include a shellcode detection module 214 that may detect and identify shellcode. In one example, the shellcode detection module 214 may include a monitoring module 216, an API rule creation module 218, a process filter rule creation module 220, a termination module 222, a back-tracing module 224, a scanning module 226, and a signature generating module 228.

The monitoring module 216 may monitor at least one API. For example, the monitoring module 216 may monitor APIs that are commonly used by shellcode to execute an attack on a computing device. Examples of APIs that the monitoring module 216 may monitor may include, but are not limited to, LoadLibraryA, GetProcAccess, URLDownloadToFile, and the like. The API rule creation module 218 may create a first set of at least one rule regarding the APIs being monitored by the monitoring module 216. For example, the API rule creation module 218 may create a rule that is satisfied if LoadLibraryA and GetProcAddress are called. Another example of a satisfied rule may include when an executable is downloaded using an API (e.g., URLDownloadToFile) monitored by the monitoring module 216.

In one configuration, the process filter rule creation module 220 may create a second set of at least one rule regarding one or more processes that are usually initiated by shellcode during an attack. For example, a rule may be satisfied if at least one of iexplorer.exe, java.exe, firefox.exe, adobe.exe, etc. is executed. The termination module 222 may terminate or prevent an API function and/or a process from executing if one or more rules from the first set of rules and/or the second set of rules are satisfied. As a result, the API rules or the process filter rules may act as a choke point to prevent a shellcode attack from continuing to occur when at least one of these rules is satisfied.

The back-tracing module 224 may perform a back-tracing operation in the memory 106 of the client device 102 and in the hooked API call to determine the process that called the hooked API (e.g., URLDownloadToFile). The back-tracking module 224 may retrieve an address in memory of the process that called the API. With the memory address of the process that called the API, a certain size of the memory 106 from the memory address may be determined. In addition, a search for a certain code (as opcode) from the memory address of the process that called the API may be conducted. For example, the memory may be scanned for one or more signatures retrieved from a database of signatures of known threats and exploits.

The scanning module 226 may conduct a scan of the memory 106 from either of these determined memory locations to determine if the one or more signatures retrieved from the database matches a signature stored in memory. As a result, the scanning module 226 may scan the area of the memory 106 that stores decrypted shellcode. In one configuration, the scanning module 226 may use any type of scanning engine such as, but not limited to, an anti-virus scan engine or a separate scan engine. Before the scanning module 226 conducts the scan of the memory, additional rules regarding the characteristics of the shellcode may be applied. For example, a rule may be applied that includes checking whether the address of the process that called the API is in heap memory, stack memory, and the like. If the scanning module 226 identifies a signature stored in memory that matches the one or more signatures retrieved from the database, the termination module 222 may terminate or block the process from executing.

If, however, the scanning module 226 does not identify a signature in memory that matches the one or more retrieved signatures, the signature generating module 228 may generate a signature based on the scanned data in the memory 106. The signature generating module 228 may generate a signature if certain conditions are satisfied. For example, the signature generating module 228 may generate a signature if the source of the memory (e.g., file or URL) is determined to be suspicious. The source of the memory may be found to be suspicious based on reputation data received from reputation services. The signature generating module 228 may also generate a signature if the process in memory calls APIs that are commonly used by exploits or threats.

A signature may be generated to identify decrypted shellcode that attempted to initiate an attack on the client device 102. The generated signature may be transmitted to the back-end server 110 across the network 108. The signature may be stored in the database 112 and retransmitted to additional client devices to prevent attacks by the shellcode identified by the signature.

Figure 3:
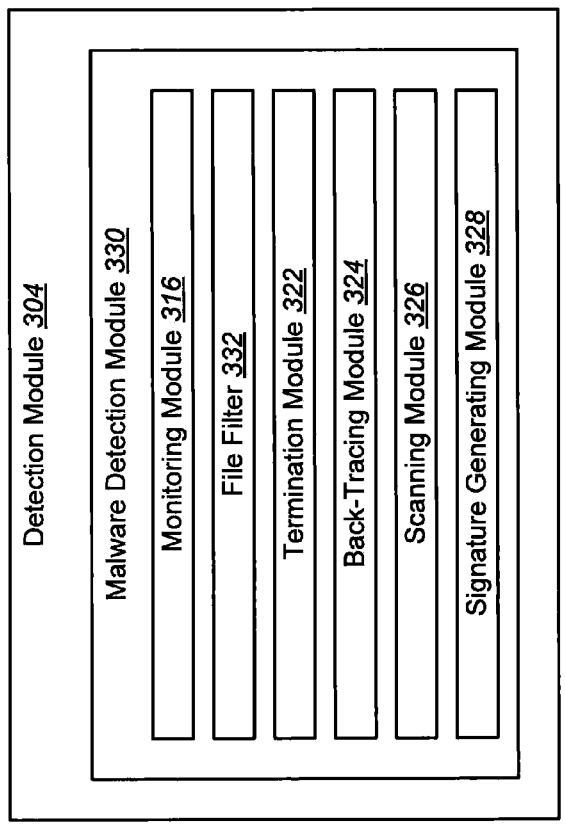
FIG. 3 is a block diagram illustrating one embodiment of a detection module in accordance with the present systems and methods.

FIG. 3 is a block diagram illustrating one embodiment of a detection module 304 in accordance with the present systems and methods. In one example, the detection module 304 may include a malware detection module 330. The malware detection module 330 may include a monitoring module 316, a file filter 332, a termination module 322, a back-tracing module 324, a scanning module 326, and a signature generating module 328.

The monitoring module 316 may monitor at least one API. For example, the monitoring module 316 may monitor APIs that are commonly used by malware to execute an attack on a computing device. Examples of APIs that the monitoring module 216 may monitor may include, but are not limited to, CreateMutex, CreateRemoteThread, WriteFile, and the like. The file filter 332 may determine whether a file calling the monitored APIs is suspicious. Using the file filter 332 may reduce false positives and performance issues. In one embodiment, the file filter 332 may verify the reputation of the file stored in the cloud. In addition, the file filter 332 may check a cache of previously scanned files to determine whether the file has already been scanned. The termination module 322 may terminate or prevent an API function and/or a process from executing if the file filter 332 determines the file is suspicious.

The back-tracing module 324 may perform a back-tracing operation in the memory 106 of the client device 102 to identify the process that called a particular API. In addition, the back-tracing module 324 may perform a back-tracing operation of a hooked API call to determine the process that called the API (e.g., CreateMutex). The back-tracking module 224 may retrieve an address in memory of the process that called the API. With the memory address of the process that called the API, a certain size of the memory 106 from the memory address may be determined. In addition, a search for a certain code (as opcode) from the memory address of the process that called the API may be conducted. In one configuration, the memory may be scanned for one or more signatures previously retrieved from a database.

The scanning module 326 may conduct a scan of the memory 106 from either of these determined memory locations to determine is a match of the retrieved signatures exists in the memory. As a result, the scanning module 326 may scan the area of the memory 106 that stores unpacked malware. In one configuration, the scanning module 326 may use any type of scanning engine such as, but not limited to, an anti-virus scan engine or a separate scan engine. Before the scanning module 326 conducts the scan of the memory, additional rules regarding the characteristics of the malware may be applied.

In one embodiment, if no matching signature is found in the scanned memory, the signature generating module 328 may generate a signature based on the scanned data in the memory 106. As a result, a signature may be generated to identify unpacked malware that attempted to initiate an attack on the client device 102. The generated signature may be transmitted to the back-end server 110 across the network 108. The signature may be stored in the database 112 and retransmitted to additional client devices to prevent attacks by the malware identified by the signature.

In one example, if a matching signature if identified in the memory during the scan of the memory, the process may be blocked or terminated. In one embodiment, the termination module 322 may block or terminate the process, which may be considered to be an exploit or threat.

Figure 4:
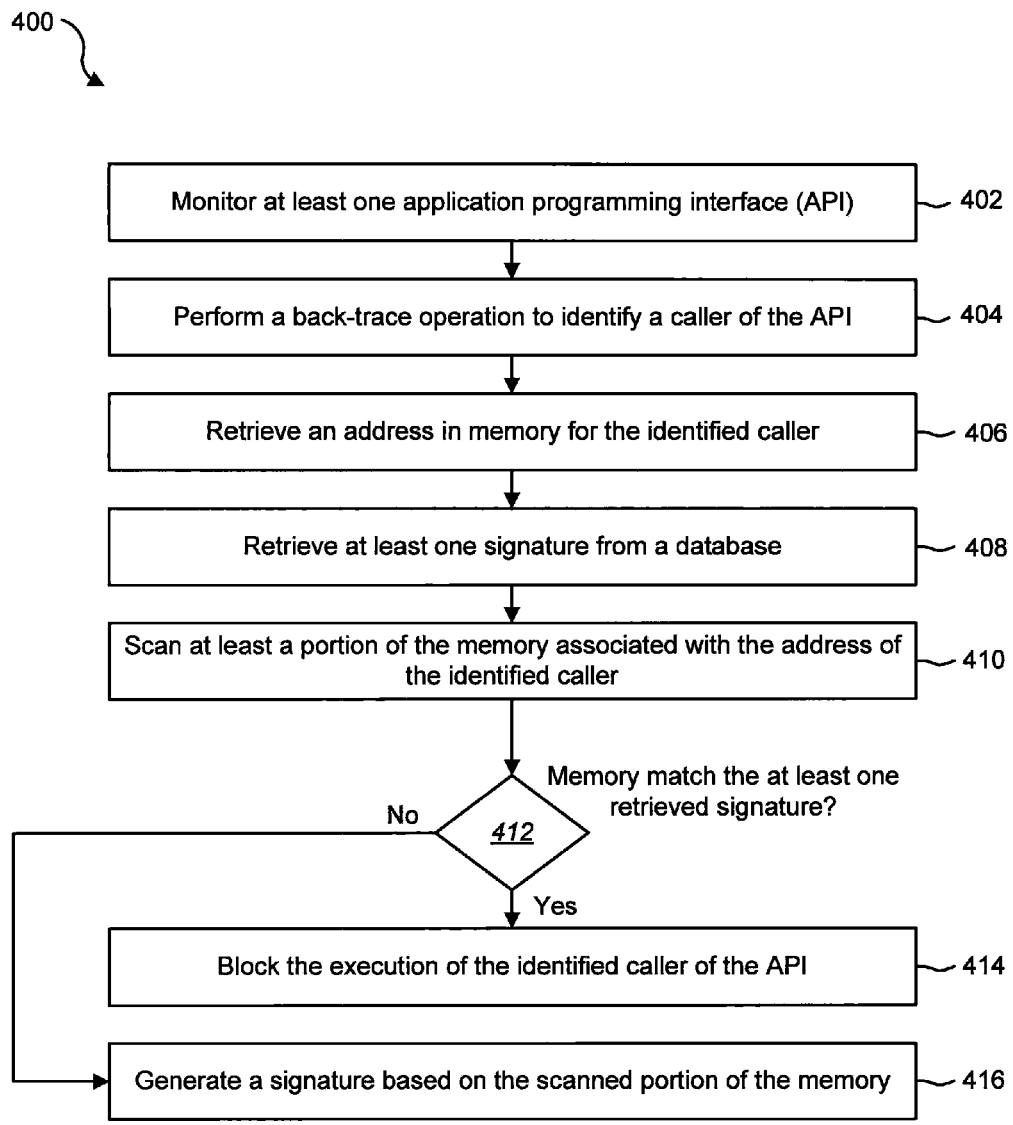
FIG. 4 is a flow diagram illustrating one embodiment of a method to back-trace from a hooked API to scan memory for a threat to a client device.

FIG. 4 is a flow diagram illustrating one embodiment of a method 400 to back-trace from a hooked API to scan memory for a threat to a client device 102. In one configuration, the method 400 may be implemented by the detection module 104.

In one example, at least one API may be monitored 402. A back-trace operation may be performed 404 to identify a caller of the API. An address in memory for the identified caller of the API may be retrieved 406. In addition, at least one signature may be retrieved 408 from a database. In one configuration, at least a portion of the memory associated with the address of the identified caller may be scanned 410. A determination 412 may be made as to whether the scanned memory matches the at least one retrieved signature. If it is determined 412 that the scanned memory matches the signature, the execution of the identified caller may be blocked 414 or terminated. If, however, it is determined 412 that the memory does not match the signature, a signature may be generated 416 based on the scanned portion of the memory. As a result, a scan of the memory may allow a scan of an unpacked/decrypted threat to occur. The generated signature may represent the threat in an unpacked/decrypted form.

Figure 5:
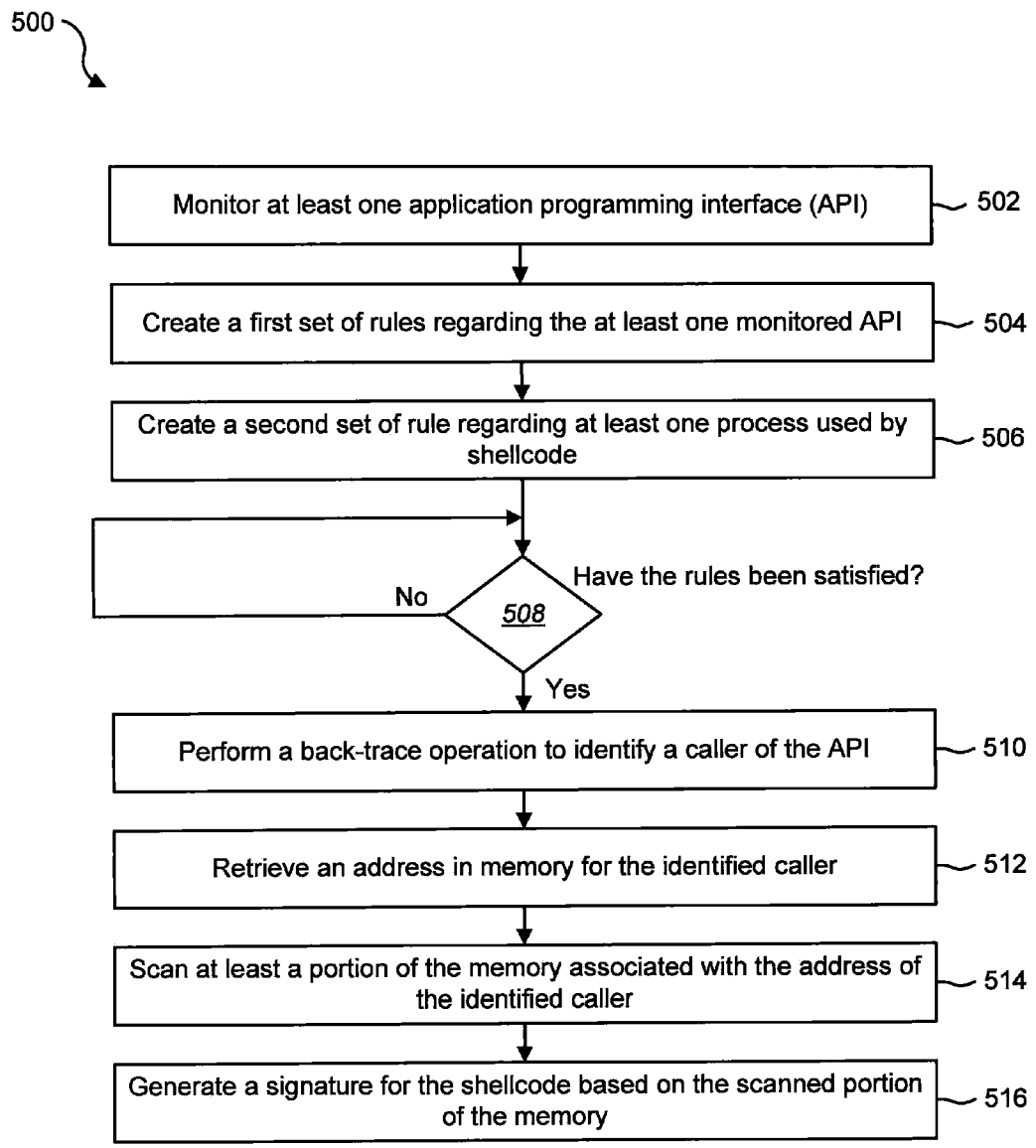
FIG. 5 is a flow diagram illustrating one embodiment of a method to back-trace from a hooked API to scan memory for decrypted shellcode attempting to attack a client device.

FIG. 5 is a flow diagram illustrating one embodiment of a method 500 to back-trace from a hooked API to scan memory for decrypted shellcode attempting to attack a client device 102. In one configuration, the method 500 may be implemented by the shellcode detection module 214.

In one embodiment, at least one API may be monitored 502. A first set of rules regarding the at least one monitored API may be created 504. Further, a second set of rules regarding at least one process used by shellcode may be created 506. In one example, a determination 508 may be made as to whether the first set of rules and the second set of rules have been satisfied. If it is determined 508 that the first and second sets of rules have not been satisfied, the method 500 may return to continue to determine 508 whether the sets of rules have been satisfied. If, however, it is determined 508 that the first set of rules and the second set of rules have been satisfied, a back-trace operation may be performed 510 to identify a caller of the API. An address in memory may be retrieved 512 for the identified caller. In one configuration, at least a portion of the memory associated with the address of the identified caller may be scanned 514. In addition, a signature for the shellcode may be generated 516 based on the scanned portion of the memory. As a result, a scan of the memory may allow a scan of the decrypted shellcode to occur. The generated signature may represent the shellcode in a decrypted form.

Figure 6:
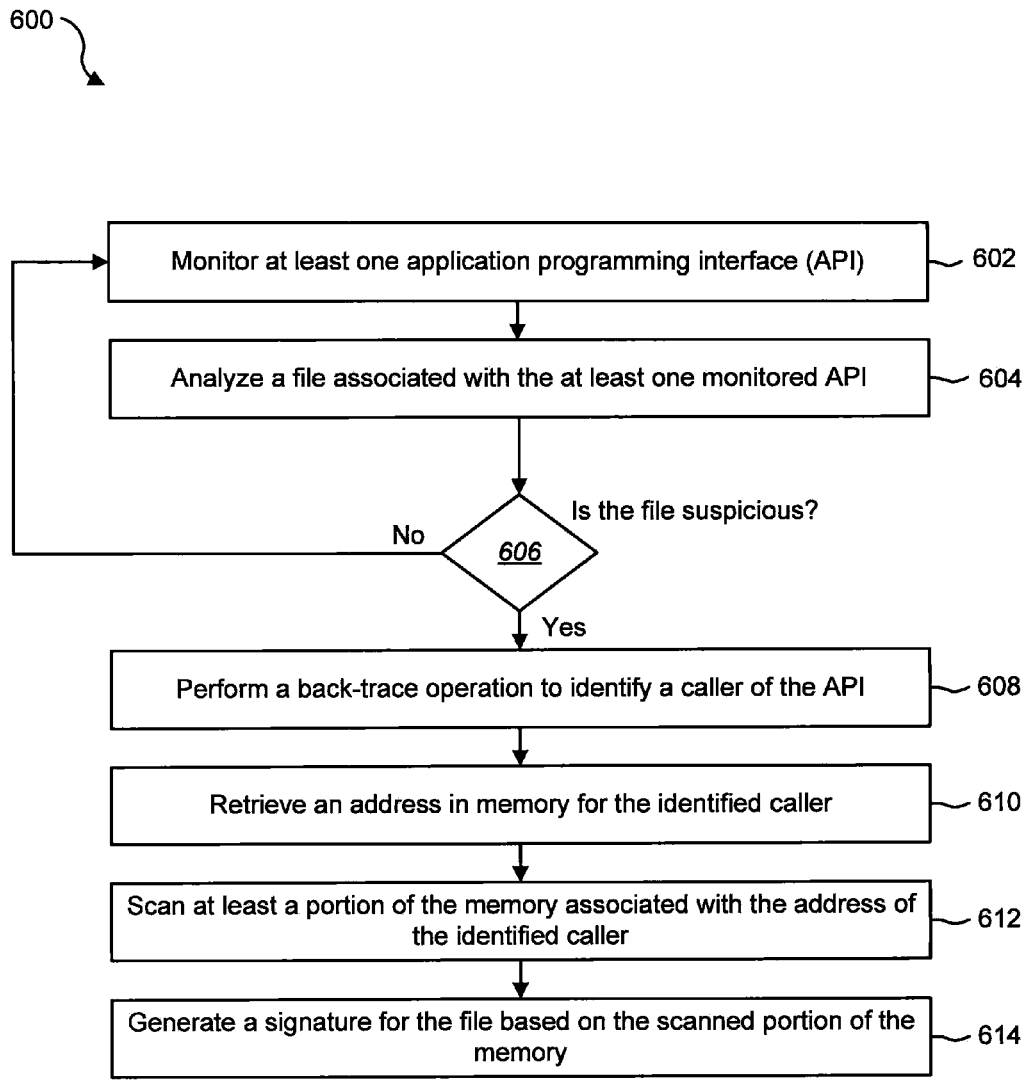
FIG. 6 is a flow diagram illustrating one embodiment of a method to back-trace from a hooked API to scan memory for unpacked malware attempting to attack a client device.

FIG. 6 is a flow diagram illustrating one embodiment of a method 600 to back-trace from a hooked API to scan memory for unpacked malware attempting to attack a client device 102. In one configuration, the method 600 may be implemented by the malware detection module 330.

In one example, at least one API may be monitored 602. A file associated with the at least one monitored API may be analyzed 604. A determination 606 may be made as to whether the analyzed file is suspicious. If it is determined 606 that the analyzed file is not suspicious, the method 600 may return to monitor 602 at least one API. If, however, it is determined that the analyzed file is suspicious, a back-trace operation may be performed 608 to identify a caller of the API. In one embodiment, an address in memory for he identified caller may be retrieved 610. At least a portion of the memory associated with the address of the identified caller may be scanned 612. In one configuration, a signature for the file may be generated 614 based on the scanned portion of the memory. As a result, a scan of the memory may allow a scan of unpacked malware to occur. The generated signature may represent the malware in unpacked form.

Figure 7:
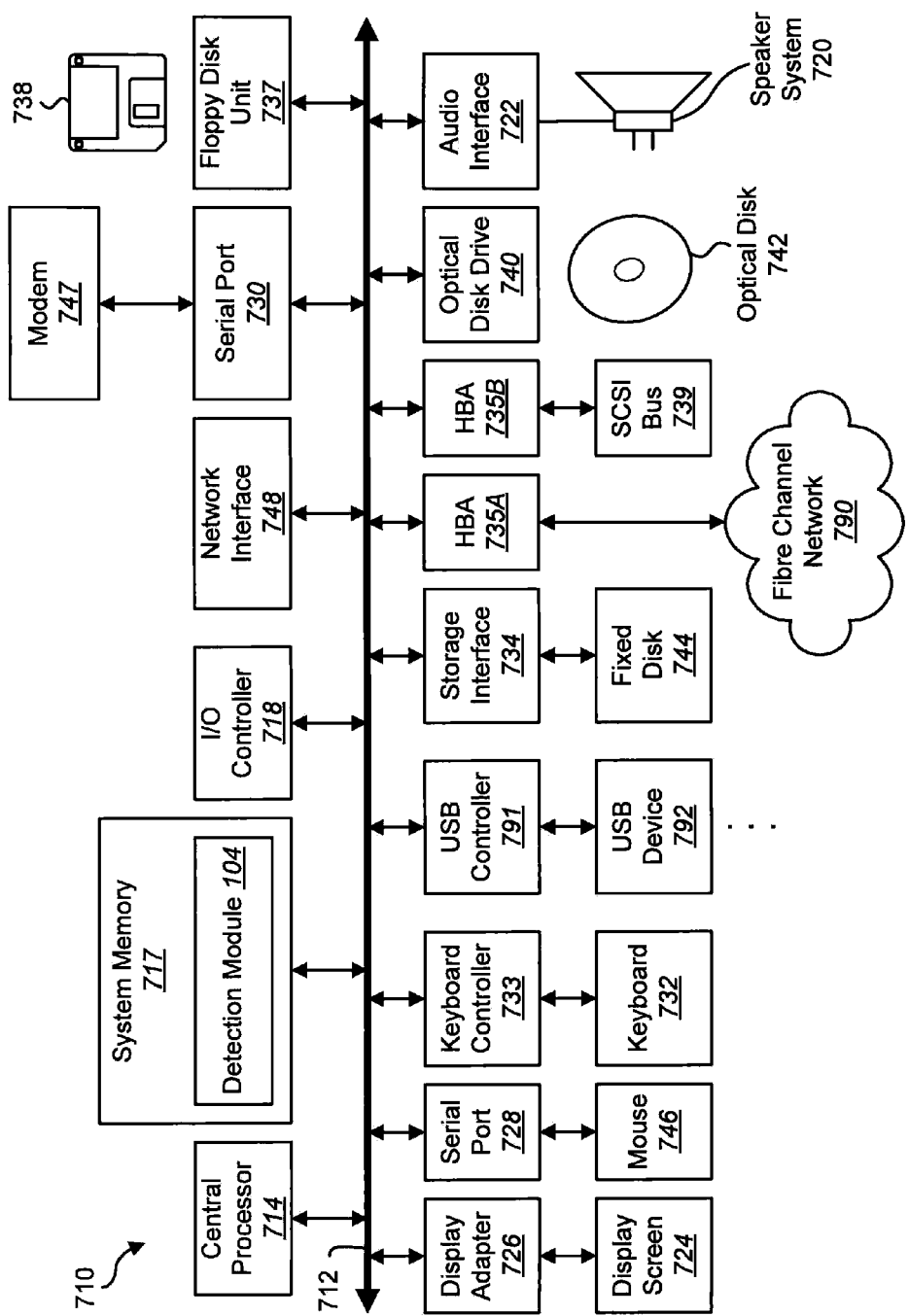
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the detection module 104 to implement the present systems and methods may be stored within the system memory 717. Applications resident with computer system 710 are generally stored on and accessed via a non-transitory computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
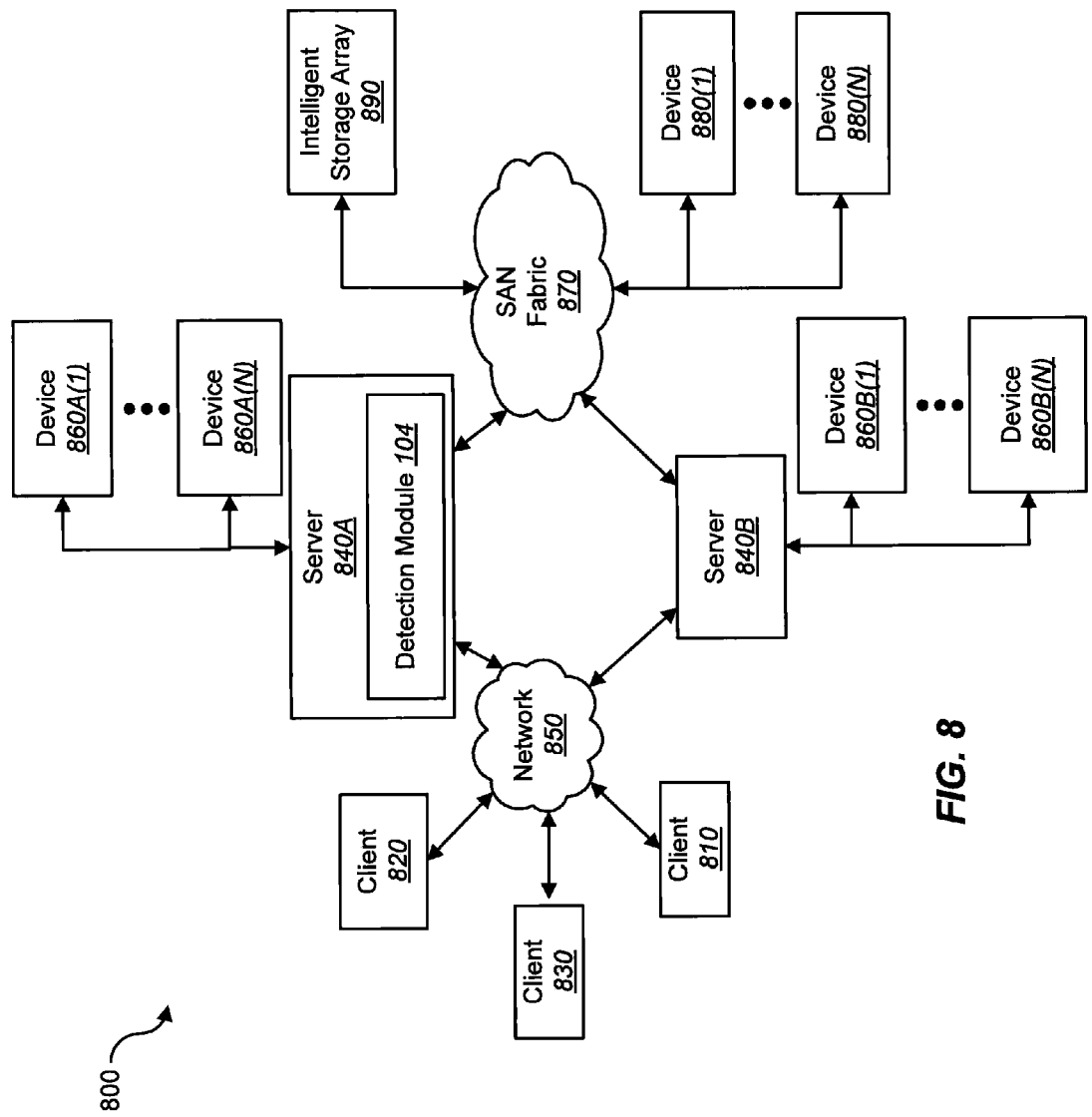
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, the detection module 104 may be located within the storage servers 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to scan memory for a threat, comprising:
  monitoring, by a processor, at least one application programming interface (API);
  performing, by the processor, a back-trace operation from the at least one API to identify a process that called the at least one API;
  retrieving, by the processor, an address in memory for the identified process;

decrypting an encrypted form of shellcode or unpacking a packed form of malware;
storing the decrypted form of shellcode or the unpacked form of malware in a storage medium;
retrieving, by the processor, at least one signature from a database, wherein the retrieved signature comprises a signature of the decrypted shellcode or the unpacked malware;
scanning, by the processor, at least a portion of the memory;
upon determining that the scanned memory matches the at least one retrieved signature, blocking, by the processor, the execution of the identified process; and
upon determining that the scanned memory does not match the at least one retrieved signature, generating, by the processor, a signature based on the scanned portion of the memory associated with the address of the identified process.

2. The method of claim 1, wherein the generated signature identifies the threat.

3. The method of claim 2, wherein the threat comprises decrypted shellcode stored in memory.

4. The method of claim 2, wherein the threat comprises unpacked malware stored in memory.

5. The method of claim 1, further comprising creating a first set of rules associated with the at least one API.

6. The method of claim 1, further comprising creating a second set of rules associated with a process used by the threat.

7. The method of claim 1, further comprising setting a predetermined size of memory to scan based on the location of the address of the identified process.

8. The method of claim 1, further comprising searching for predetermined operational code in the memory from the location of the address of the identified process.

9. The method of claim 1, further comprising transmitting the generated signature to a server, wherein the server stores the generated signature in a database.

10. A computing device configured to scan memory for a threat, comprising:
a processor;
memory in electronic communication with the processor;
instructions stored in the memory, the instructions executable by the processor to:
monitor at least one application programming interface (API);
perform a back-trace operation from the at least one API to identify a process that called the at least one API;
retrieve an address in memory for the identified process;
decrypt an encrypted form of shellcode or unpack a packed form of malware;
store a decrypted form of shellcode or an unpacked form of malware in a storage medium;
retrieve at least one signature from a database, wherein the retrieved signature comprises a signature of the decrypted shellcode or the unpacked malware;
scan at least a portion of the memory;
upon determining that the scanned memory matches the at least one retrieved signature, block the execution of the identified process; and
upon determining that the scanned memory does not match the at least one retrieved signature, generate a signature based on the scanned portion of the memory associated with the address of the identified process.

11. The computing device of claim 10, wherein the generated signature identifies the threat.

12. The computing device of claim 11, wherein the threat comprises decrypted shellcode stored in memory.

13. The computing device of claim 11, wherein the threat comprises unpacked malware stored in memory.

14. The computing device of claim 10, wherein the instructions executable by the processor to:
create a first set of rules associated with the at least one API.

15. The computing device of claim 10, wherein the instructions executable by the processor to:
create a second set of rules associated with a process used by the threat.

16. The computing device of claim 10, wherein the instructions executable by the processor to:
set a predetermined size of memory to scan based on the location of the address of the identified process.

17. The computing device of claim 10, wherein the instructions executable by the processor to:
search for predetermined operational code in the memory from the location of the address of the identified process.

18. The computing device of claim 10, wherein the instructions executable by the processor to:
transmit the generated signature to a server, wherein the server stores the generated signature in a database.

19. A computer-program product to scan memory for a threat, the computer-program product comprising a non-transitory computer-readable medium having instructions thereon, the instructions being executable by a processor to:
monitor at least one application programming interface (API);
perform a back-trace operation from the at least one API to identify a process that called the at least one API;
retrieve an address in memory for the identified process;
decrypt an encrypted form of shellcode or unpack a packed form of malware;
store a decrypted form of shellcode or an unpacked form of malware in a storage medium;
retrieve at least one signature from a database, wherein the retrieved signature comprises a signature of the decrypted shellcode or the unpacked malware;
scan at least a portion of the memory;
upon determining that the scanned memory matches the at least one retrieved signature, block the execution of the identified process; and
upon determining that the scanned memory does not match the at least one retrieved signature, generate a signature based on the scanned portion of the memory associated with the address of the identified process.

20. The computer-program product of claim 19, wherein the threat comprises decrypted shellcode stored in memory or unpacked malware stored in memory.

* * * * *